Aug. 8, 1933.  A. A. WARNER  1,921,274
UNIVERSAL JOINT
Filed Oct. 13, 1932
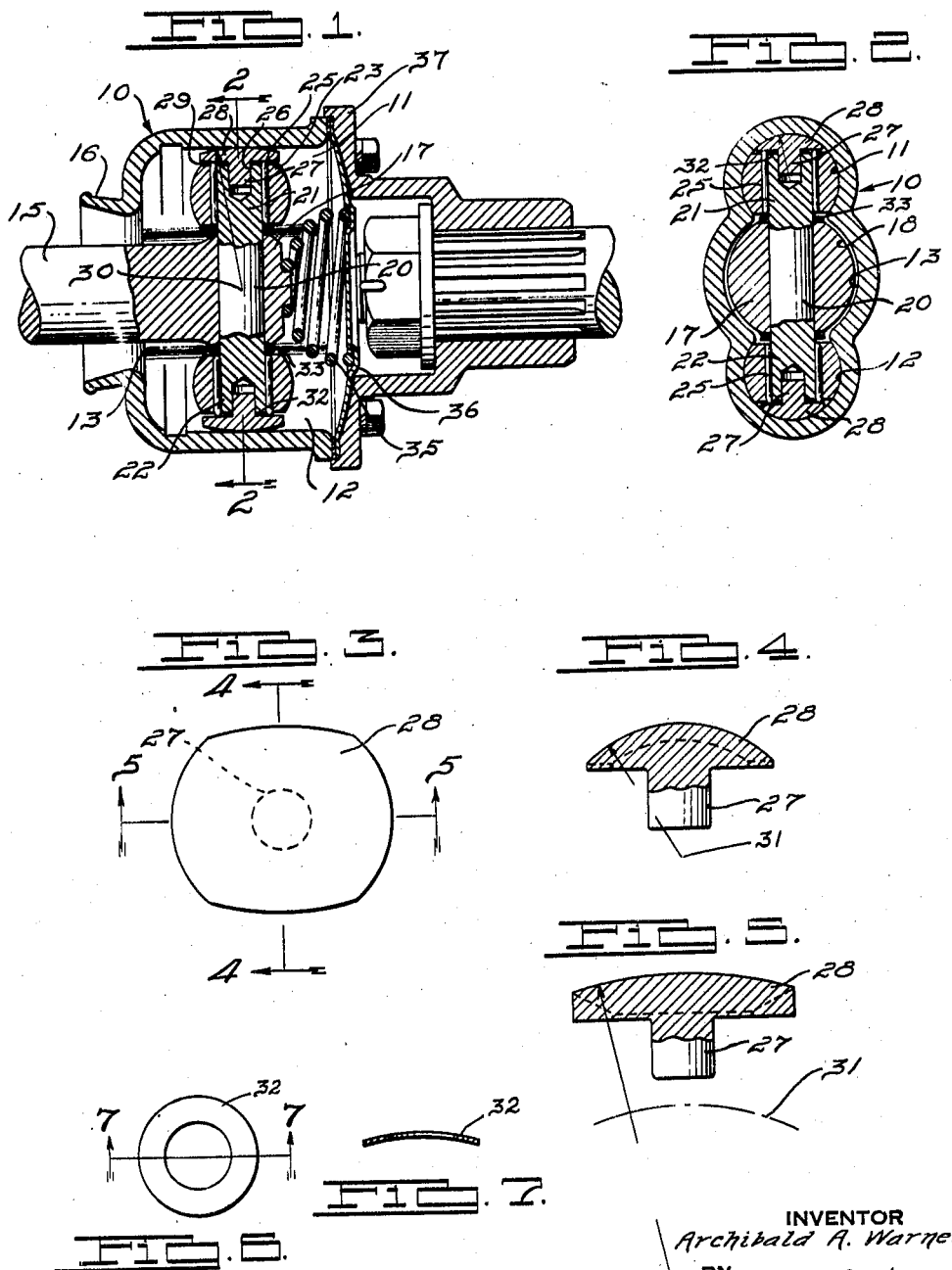
INVENTOR
Archibald A. Warner
BY
Harness, Dickey,
Pierce & Hanno
ATTORNEYS.

Patented Aug. 8, 1933

1,921,274

UNITED STATES PATENT OFFICE 1,921,274

UNIVERSAL JOINT

Archibald A. Warner, Royal Oak, Mich., assignor to The Universal Products Company, Inc., a Corporation of Delaware Application October 13, 1932. Serial No. 637,615

13 Claims. (Cl. 64—103)

The invention relates to joints for shafts, and has particular relation to a joint of universal character.

Particularly, the invention relates to a universal joint of the character disclosed in my copending application for patent relating to universal joints, Serial No. 497,486, filed November 22, 1930. In a joint of the character illustrated in such copending application for patent, a casing is provided at opposite sides with cylindrical guides and a central guide of cylindrical character. This casing is adapted to be connected to one shaft. A second shaft member projects into the casing and into the cylindrical central guide, and is provided with trunnions projecting from opposite sides thereof, and into the cylindrical guide at opposite sides of the central guide. The ends of these trunnions are provided with what may be called truncated spherical bearing members having a radius of curvature substantially equal to the radius of curvature of the side guides and such spherical members are rotatable on the trunnions and movable axially thereof. The relative axial movement permitted between the spherical members and the trunnions, permits movement of the shaft member in the plane of the guides as, during such pivotal movement, the spherical bearing members must move relative to the trunnions to maintain their positions in the side guides. Owing to this relative movement, however, it has been found somewhat difficult to center the second shaft member between the guides.

In manufacturing a joint of this character, it is easier and less expensive to construct the cylindrical side guides parallel to each other and rectilinear in direction, as it is then possible to accurately machine their surfaces by means of boring tools. This being the case, it becomes apparent that the ends of the trunnions during fulcruming movement of the shaft in the plane of the cylindrical side guides, ordinarily could not contact with the walls of such side guides during such fulcruming movement, although possibly the ends of the trunnions might contact with the guides when the axis of the trunnions is disposed in a plane perpendicular to the walls of the guides such as when the two shafts have their axes in alignment. As soon, however, as the second shaft member fulcrums in the plane of the side guides, the ends of the trunnions begin to move away from the walls of the side guides. Accordingly, the guides may not serve in the most efficient manner for centering the trunnions and shaft member between the side guides and it is necessary to provide some means, such as in the central guide for effecting this result. While this result has been achieved in this manner, it has been found desirable to accomplish it in the manner set forth hereinafter.

According to the particular embodiment of the invention illustrated, centering buttons are provided on the ends of the trunnions for engagement with the walls of the side guides and these buttons have their outer surfaces curved substantially about the axis of fulcruming movement of the shaft member in the plane of the side guides. This arrangement causes the buttons at all times to engage the side guides beyond the ends of the trunnions during such fulcruming movement and accordingly to center the shaft member between the guides. Preferably also it has been found desirable to curve such centering buttons transversely of the plane of such fulcruming movement, with a radius of curvature substantially equaling that of the side cylindrical guides, so that greater contact will be had between the buttons and the walls of the side guide during the fulcruming movement.

One object of the invention, therefore, is to provide a joint of the general character set forth, in which the shaft member provided with trunnions, is centered in a more efficient manner between the guides for the trunnions.

Another object of the invention is to provide a joint of this character which insures operative abutment of the ends of the trunnions for centering them and the shaft member to which they are connected, with the walls of the guides for the trunnions, during any fulcruming movement of the one shaft member either about the axis of the trunnions or in the plane of such guides.

Other objects of the invention will become apparent from the following specification, and the claims hereinafter set forth.

For a better understanding of the invention reference may be had to the accompanying drawing, forming a part of the specification, wherein:

Figure 1 is a longitudinal, cross-sectional view of a universal joint constructed according to one form of the invention.

Fig. 2 is a cross-sectional view taken substantially along the line 2—2 of Fig. 1.

Fig. 3 is a plan view on a larger scale, of one of the centering buttons on the ends of the trunnions in the joint.

Fig. 4 is a cross-sectional view taken substantially along the line 4—4 of Fig. 3.

Fig. 5 is a cross-sectional view taken substantially along the line 5—5 of Fig. 3.

Fig. 6 is a plan view of the resilient washer disposed between the buttons and the ends of the trunnions.

Fig. 7 is a cross-sectional view taken substantially along line 7—7 of Fig. 6.

Referring to Figs. 1 and 2, a casing 10 is provided, having cylindrical sides 11 and 12 and a central cylindrical guide 13. These guides have their axes of curvature substantially parallel and rectilinear in direction. The casing is adapted to receive a shaft member 15 which projects thereinto through a larger bell-type opening 16 to permit universal movement of the shaft member about fulcrums within the casing. This shaft member projects into the central guide 13 and there is provided with an enlarged end portion 17 having spherical side surfaces indicated at 18. In other words, the sides of the portion 17 are of ball-like character so as readily to permit fulcruming movement of the shaft member in the plane of and transversely of the guides.

A pin 20 projects through this enlarged portion 17 and is rigidly connected thereto, and opposite ends of the pin project into the guides 11 and 12, to provide trunnions 21 and 22. Each trunnion is provided with a truncated spherical bearing member 23 having a radius of curvature substantially equal to the radius of curvature of the guides 11 and 12, and consequently such bearing members normally will have line contact at opposite sides with the side walls of the guide in which it is disposed. Such bearing members are also slidable axially on the trunnions, and rotatable with respect thereto, and preferably anti-friction rollers 25 will be provided between the peripheral surface of each trunnion and the inner peripheral surface of each bearing.

The end of each trunnion also is provided with an opening 26 adapted to rotatably receive a pin portion 27 of a button 28 covering the end of the trunnion and abutting it around the opening. It will be noted that the spherical bearing member 23 is so truncated next to the button 28, that a space 29 is provided at least when the pin 20 is in the position shown by Fig. 1. This space will permit traveling of the spherical bearing members outwardly toward the ends of the trunnions during pivotal movement of the shaft member 15 in the plane of the side guides, without engagement of the spherical bearing members with the margins of the button 28.

Each button has its outer surface curved in the direction longitudinally of the guide, substantially about an axis 30 located midway between the ends of the pin 20 and which normally constitutes the axis of pivotal or fulcruming movement of the shaft member 15 in the plane of the guides. It will therefore be appreciated, that if the shaft member 15 is fulcrumed in such plane, the button will constantly maintain contact with the walls of the guides 11 and 12, although of course it will be understood that the contact point will change on the button surface as the fulcruming movement occurs. In other words, a new point on the button surface will come into contact with the guide surface as the fulcruming movement progresses. Transversely, the outer surface of the button also is curved with a radius of curvature substantially equaling that of the side guides 11 and 12 but, owing to the fact that the button is carried with the trunnions during the fulcruming movement of the shaft member 15 in the plane of the guides, it is necessary that the outer surface of the button be cylindrical, in curvature transversely thereof, with the axis of curvature 31 curved substanially about the axis 30. This is illustrated in Figs. 4 and 5 where the axis of curvature of the button transversely of the guide is indicated at 31.

Between each button and the end of the trunnion adjacent thereto, a bowed spring washer 32 is provided, which tends to retain a bowed shape as shown by Fig. 7. When the parts of the joint are assembled, this washer is flattened or at least partially flattened, as seen in Fig. 1, and accordingly it will maintain the buttons in contact with the guides 11 and 12 and center the shaft 15, even though slight play otherwise would exist.

For preventing the inner ends of the hard rollers 25 from biting into the enlarged portion 17 of the shaft 15, during operation of the joint, a hard steel ring 33 is disposed around the base of each trunnion for engaging the ends of the rollers and preventing wear on said enlarged portion.

The joint also is provided with helical spring means 35 engaging the enlarged portion 17 on shaft member 15, which engage at their other end a disc member 36 secured to the casing 10 by means of a casting 37. The casting 34 is adapted to be connected to another shaft member.

It is apparent that the shaft member 15 may rotate relative to the casing 10, about the axis of the pin 20 and that during such fulcruming movement, the spherical bearing members 23 and the buttons 28 not only center the pin but guide such fulcruming movement and maintain the axis definitely located. When the shaft 15 fulcrums in the plane of the guides 11 and 12, spherical bearing members 23 will move longitudinally of the guides and axially toward the ends of the trunnions and ordinarily, the bearing members will in fact roll along in the guides while moving axially in the manner stated. Moreover, it will be seen that the buttons maintain contact with the side guides to maintain the shaft member centered in the casing during such fulcruming movement. It will, of course, be appreciated that the shaft member 15 and the parts mounted thereon, can as a unit move bodily in a direction longitudinally of the casing 10 without interfering with the manner of operation of the joint.

A joint of the character described is very efficient in operation and inexpensive to manufacture. The relatively few parts involved make the joint very desirable and particularly so, when uniform and positive self-centering operation of the joint is considered. Use of the roller bearings greatly increases the durability of the joint while at the same time reduces friction in its operation, to a minimum. In general, the joint has been found to be highly satisfactory for universally connecting rotary shafts where a universal connection is required.

Although only one form of the invention has been illustrated and described in detail, it will be apparent to those skilled in the art that various modifications may be made without departing from the scope of the appended claims.

I claim:

1. A universal joint comprising a casing having opposed and parallel cylindrical guides, a shaft member projecting endwise into the casing between the guides, trunnions projecting transversely from opposite sides of the member and into the guides, truncated spherical members having openings receiving the trunnions for slidable movement thereon, each spherical member contacting with one guide at opposite sides of the trunnion, and a member on the end of each trunnion for engaging the guide beyond the end of the trunnion.

2. A universal joint comprising a casing having opposed and parallel cylindrical guides, a shaft member projecting endwise into the casing between the guides, trunnions projecting transversely from opposite sides of the member and into the guides, truncated spherical members having openings receiving the trunnions for slidable movement thereon, each spherical member contacting with one guide at opposite sides of the trunnion, and a member on the end of each trunnion for engaging the guide beyond the end of the trunnion, said last mentioned member having its surface next to the wall of the guide curved in the direction of the guide about an axis passing transversely through the shaft member substantially at its center.

3. A universal joint comprising a casing having opposed and parallel cylindrical guides, a shaft member projecting endwise into the casing between the guides, trunnions projecting transversely from opposite sides of the member and into the guides, truncated spherical members having openings receiving the trunnions for slidable movement thereon, each spherical member contacting with one guide at opposite sides of the trunnion, and a member on the end of each trunnion for engaging the guide beyond the end of the trunnion, said last mentioned member having its surface next to the wall of the guide curved in the direction of the guide about an axis passing transversely through the shaft member substantially at its center and curved transversely of the guide.

4. A universal joint comprising a casing having opposed and parallel cylindrical guides, a shaft member projecting endwise into the casing between the guides, trunnions projecting transversely from opposite sides of the member and into the guides, truncated spherical members having openings receiving the trunnions for slidable movement thereon, each spherical member contacting with one guide at opposite sides of the trunnion, and a member on the end of each trunnion for engaging the guide beyond the end of the trunnion, said last mentioned member having its surface next to the wall of the guide curved in the direction of the guide about an axis passing transversely through the shaft member substantially at its center and curved transversely of the guide substantially with a radius of curvature equal to that of the guide.

5. A universal joint comprising a casing having opposed and parallel cylindrical guides having a space therebetween, a shaft member projecting endwise into the space, trunnions projecting from opposite sides of the shaft member, into the cylindrical guides, the shaft member and trunnions being pivotal in the plane of the cylindrical guides, means slidably mounted on the trunnions and bearing on the cylindrical guides at opposite sides of the trunnions, and curved means on the ends of the trunnions for engaging the cylindrical guides beyond the ends of the trunnions.

6. A universal joint comprising a casing having opposed and parallel cylindrical guides having a space therebetween, a shaft member projecting endwise into the space, trunnions projecting from opposite sides of the shaft member, into the cylindrical guides, the shaft member and trunnions being pivotal in the plane of the cylindrical guides, means slidably mounted on the trunnions and bearing on the cylindrical guides at opposite sides of the trunnions, and curved means on the ends of the trunnions for engaging the cylindrical guides beyond the ends of the trunnions, said curved means comprising an element on the end of each trunnion having its outer surface curved longitudinally of the guide and in the direction of said fulcruming movement of the trunnions and shaft member.

7. A universal joint comprising a casing having elongated cylindrical guides at opposite sides, and a space between and communicating with the guides, a shaft member extending into the space, trunnions projecting from opposite sides of the shaft member and into the guides, means in the space for fulcruming the shaft member for movement in the plane of the guides, truncated spherical members rotatably and slidably mounted on the trunnions and in the guideway, the radius of curvature of said truncated spherical members being substantially equal to that of the guides, and means on the extreme ends of the trunnions for engaging the guide beyond the ends of the trunnions, and centering the shaft member between the guides.

8. A universal joint comprising a casing having elongated cylindrical guides at opposite sides, and a space between and communicating with the guides, a shaft member extending into the space, trunnions projecting from opposite sides of the shaft member and into the guides, means in the space for fulcruming the shaft member for movement in the plane of the guides, truncated spherical members rotatably and slidably mounted on the trunnions and in the guideway, the radius of curvature of said truncated spherical members being substantially equal to that of the guides, and means on the extreme ends of the trunnions for engaging the guide beyond the ends of the trunnion, and centering the shaft member between the guides, said last means comprising elements mounted on the ends of the trunnions curved longitudinally about an axis substantially coinciding with the axis of fulcruming movement of the shaft member in the plane of the guides.

9. A joint comprising a member having spaced guide walls, a member projecting between the walls, for fulcruming movement in the plane of the guide walls, trunnions projecting from opposite sides of the second member to points adjacent the walls respectively, and means for maintaining the trunnions operatively in abutting relation to such walls, for centering the second member and trunnions during the fulcruming movement, said means comprising resilient, take up means between the end of a trunnion and the wall adjacent thereto.

10. A joint comprising a member having spaced guide walls, a member projecting between the walls for fulcruming movement in the plane thereof, trunnions projecting from opposite sides of the second member to points adjacent the walls respectively, means on the ends of the trunnions and movable axially with respect thereto, for operatively abutting the walls and centering the second member and trunnion during fulcruming movement, and means for resiliently maintaining the first-mentioned means in contact with said walls.

11. A joint comprising a member having spaced guideways open toward each other, a member projecting between the guideways for fulcruming movement in the plane thereof, trunnions projecting from opposite sides of the second member and into the guideways respectively, bearing means rotatably mounted on the ends of the trunnions and engaging the side portions of the guideways, means axially slidable on the end of each trunnion and engaging the outer base portion of the guideway for centering the trunnions and the second member, and resilient means between the end of the trunnion and said slidable means for resiliently and normally maintaining the latter in engagement with said base portions of the guideways.

12. A joint comprising a member having spaced guideways open toward each other, a member projecting between the guideways for fulcruming movement in the plane thereof, trunnions projecting from opposite sides of the second member into the guideways, bearing means mounted on the ends of the trunnions for axial and rotatable movement relative to the trunnions, and being adapted to engage side wall portions of the guideways, and means axially slidable on the ends of the trunnions and engaging the outer base portions of the guideways for centering the trunnions and second member.

13. A joint comprising a member having spaced guideways open toward each other, a member projecting between the guideways for fulcruming movement in the plane thereof, trunnions projecting from opposite sides of the second member into the guideways, bearing means mounted on the ends of the trunnions for axial and rotatable movement relative to the trunnions, and being adapted to engage side wall portions of the guideways, means slidably mounted on the ends of the trunnions and engaging the outer base portions of the guideways for centering the trunnions and second member, and resilient means between the end of the trunnion and the last-mentioned means for normally maintaining the latter resiliently in contact with the base portions of the guideways.

ARCHIBALD A. WARNER.